Sept. 30, 1958  P. KOLLSMAN  2,854,393
FRACTIONATION
Filed July 23, 1954  5 Sheets-Sheet 1

INVENTOR.
Paul Kollsman
BY Howard G. Russell
his ATTORNEY

Sept. 30, 1958 P. KOLLSMAN 2,854,393
FRACTIONATION
Filed July 23, 1954 5 Sheets-Sheet 2

INVENTOR.
Paul Kollsman
BY Howard G. Russell
his ATTORNEY

Sept. 30, 1958 P. KOLLSMAN 2,854,393
FRACTIONATION
Filed July 23, 1954 5 Sheets-Sheet 3

Fig. 6

MEMBRANES OF ONE POLARITY
SPACER
(a) NEUTRAL OR AMPHOTERIC
(b) OPPOSITE POLARITY, OR
(c) SAME POLARITY BUT OF LOWER CONCENTRATION OF IONS

Fig. 7

LAYERS OF ONE POLARITY
LAYERS
(a) NEUTRAL OR AMPHOTERIC
(b) OPPOSITE POLARITY, OR
(c) SAME POLARITY BUT LOWER CONCENTRATION OF IONS

Fig. 8

LAYERS OF ONE POLARITY
LAYERS
(a) NEUTRAL OR AMPHOTERIC
(b) OPPOSITE POLARITY
(c) SAME POLARITY BUT OF LOWER CONCENTRATION OF IONS.
SIMILAR ION EXCHANGE MEMBRANES

Fig. 9

DISSIMILAR ION EXCHANGE MEMBRANES

LAYERS AMPHOTERIC, NEUTRAL OR OF ONE POLARITY.

Fig. 10

INVENTOR.
Paul Kollsman
BY Howard G. Russell
his ATTORNEY

Sept. 30, 1958 P. KOLLSMAN 2,854,393
FRACTIONATION

Filed July 23, 1954 5 Sheets-Sheet 4

INVENTOR.
Paul Kollsman
BY
Howard G. Russell
his ATTORNEY

Sept. 30, 1958
P. KOLLSMAN
2,854,393

FRACTIONATION

Filed July 23, 1954
5 Sheets-Sheet 5

Fig. 15

INVENTOR.
Paul Kollsman
BY
Howard G. Russell
his ATTORNEY

United States Patent Office 2,854,393
Patented Sept. 30, 1958

2,854,393

FRACTIONATION

Paul Kollsman, New York, N. Y.

Application July 23, 1954, Serial No. 445,309

25 Claims. (Cl. 204—180)

This invention relates to the art of separating constituents of a solution into fractions under the influence of an electric current.

It has been proposed to separate anionic constituents of a solution from cationic constituents by applying an electric bias and transferring the anionic constituents in one direction and the cationic constituents in the opposite direction through permselective membranes into other volumes of fluid. According to this proposal, the separation of ions takes place on the basis of their polarity.

It has further been proposed to separate constituents of the same polarity, for example, colloids from ions, on the basis of their size, by applying an electric bias which causes the ionic constituent to migrate through a membrane through which the larger colloidal constituent cannot pass. In an apparatus of this type the membrane performs the function of a mechanical sieve. A major drawback of apparatus of the last named kind is that the larger particles, for example the colloids, tend to clog up the pores of the membranes. It is therefore necessary to reverse the direction of the current periodically, if the apparatus is to be operated for an appreciable length of time.

In the last mentioned procedure of separating colloidal constituents from smaller ionic constituents, the effect of gravity on the colloidal particles has been utilized, and it has been proposed to shape the bottom of the apparatus in the form of a hopper in which the heavier fraction collects. Likewise, it has been proposed to shape the top of the apparatus in a similar manner to withdraw the lighter constituents through a withdrawal duct attached to the top wall.

The present invention provides improvements in the separation of constituents of ionic fluids. The invention makes use of the influence of acceleration either in the form of centrifugal force, in the event the improved apparatus is mounted on a centrifuge, or in the form of gravity. In distinction from the known forms of apparatus, the invention employs barriers of ion exchange material, the polarity of the barriers being the same as that of the ions to be fractionated. As a result, the barriers, which may be membranes or layers of ion exchange material, obstruct or impede the passage of ions of the polarity to be fractionated while permitting ions of the opposite polarity to pass freely.

The fractions which do not pass the respective barriers are under the influence of gravity and accumulate in front of the respective barriers.

In distinction, the known forms of apparatus employing filter type membranes permit fractions to pass through the membrane and the fractions are separated by gravity after passing the membranes, while the colloid ions, which are filtered out, are in direct contact with the membranes and tend to clog its pores. No such clogging occurs in the practice of the invention due to stratification of the fractions in front of the passage-resistant barrier which appears to operate in the sense that in the ions which tend to produce clogging by reason of their size, are maintained spaced from the pores of the barrier by smaller non-clogging ions.

While the present invention has particular application to the separation of different ions capable of adsorbing the same solvent in different degrees, the invention is equally applicable to the separation of non-ionic components whose adsorbability to the same ion differs.

Within the first mentioned application of the invention fall the fractionation of cations, such as potassium and lithium in a salt solution, and the fractionation of anions, such as chlorine and fluorine in a salt solution. Broadly, it includes the separation of organic and inorganic cations and anions regardless of whether they are easy or difficult to separate as are the isotopes, and the rare earths, as well as the separation of non-ionic and nondissociated compounds in a solution. It also includes the separation of different compounds of different conductances and different degrees of dissociation in solution, such as water solutions of sodium chloride, borax, boric acid, sodium acetate, acetic acid. These are separable into fractions consisting of water solutions of individual component compounds or groups of such compounds.

The separation of non-ionic components of different adsorbability to the same ion or the same ion exchange material includes the separation of weakly ionic or non-ionic constituents of a conductive liquid, for example the treatment of raw sugar solutions. It also includes the separation of non-ionic constituents of an essentially non-conductive liquid, such as a mixture of different organic substances, for example, crude oil or other hydrocarbon mixtures. Benzene and acetone may be separated. Mixtures of different alcohols, of acetone and water, of benzene and water may be separated, a sugar concentrate may be produced from an essentially non-conductive sugar-in-water solution, in fact non-conductive solutions of basically liquid, gaseous and solid compounds may be treated for the purpose of separation of their components.

Certain forms of apparatus embodying the invention are suited for the fractionation of gaseous mixtures comprising different components in either vapor or gas form or a mixture of both. Examples of such mixtures are air and acetone, air and benzene, air and water vapor, mixtures of different gaseous hydrocarbons as occur in the processing of natural gas.

These and various objects, features and advantages of the invention will appear more fully from the detailed description which follows accompanied by drawings showing for the purpose of illustration preferred forms of apparatus for practicing the invention. The invention also consists in certain new and original features of construction and combination of elements, as well as steps and sequences of steps hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Fig. 15 is a chart showing various barrier-filler combinations and their uses.

In the following description, and in the claims, various details will be identified by specific names for convenience. The names, however, are intended to be generic in their application. Like reference characters refer to like parts in the several figures of the drawings.

In the drawings accompanying and forming part of this specification, certain specific disclosure of the invention is made for the purpose of explanation of broader aspects of the invention, but it is understood that details of the method, as well as the structural details of the apparatus may be modified in various respects without departure from the principles of the invention, and that the invention may be applied to, or practiced by, other structures than the ones shown.

In accordance with the invention, the solution to be fractionated is passed through an apparatus comprising basically, a housing within which the ions of the solution encounter successively zones of different ionic concentration. Such zones may be represented by layers of ion exchange material, layers of liquid, and porous substances. Layers of ion exchange material may be bonded together to form membranes, or they may be compressed or non-compressed ion exchange particles of granular form or bead form confined by suitable grids, screening or spacers to remain in layer form.

Such layers or zones subdivide the housing into compartments through which the fluid to be fractionated is directed. The direction of fluid flow is so chosen as to comprise a substantial component of flow direction normal to the direction of acceleration. In the case of gravity, the direction of flow would be substantially horizontal. Under the influence of gravity the lighter fractions rise and the heavier fractions drop and can then be withdrawn separately.

The compartments may simply be void spaces lying between the barriers or they may contain a macroporous filler of inert or of active material through which the liquid flows. An inert filler suited for this purpose may have the form of glass beads or glass fibres, and an active filler may be an ion exchange material having a concentration of ions of the same polarity but differing from that of the barriers, or it may be an ion exchange material of opposite polarity.

A basic form of apparatus embodying the present invention is shown in Figures 1 to 4. The apparatus comprises components permitting modification of its construction by omission or addition of components, as will later appear. The apparatus comprises a housing 11 consisting of guard sections 12, 13 flanking a main section 14. End sections 15 and 16 contain electrodes 17 and 18 from which leads 19 and 20 extend.

The several sections are so shaped as to permit assembly in various combinations. For this reason, the sections have recessed ends, as indicated at 21, for example, fluid tightly fitting over corresponding recessed ends 22 of the abutting section. It is thus possible to omit a guard section, for example section 12, and to fit the end section 16 directly on the main section 14 as diagrammatically illustrated in Figure 5.

The barriers of ion exchange material are shown as having the form of membranes 23, 24, 25, 26, 27, 28 and 29 in the main section 14. Membranes 30 and 31 are clamped between the end section 15 and the guard section 12, and the guard section 12 and the main section 14, respectively. Similarly, membranes 32 and 33 are clamped between the end section 18 and the guard section 13, and the guard section 13 and the main section 14, respectively. Membranes 34, 35, 36 and 37 are mounted within the guard sections 12 and 13.

The main section 14 contains substantially horizontally extending channels 38, 39 and 40 to which supply ducts 41, 42 and 43 lead. In many instances it is sufficient to supply all the liquid through one duct, for example centrally through 42, 39 and to omit the other two inlets. The channels 38, 39 and 40 extend across the entire width of the main section 14 and supply liquid evenly to the compartments 44 of the main section. A screen 45 may be fitted across the face of the membranes for purposes hereinafter described.

The membranes of the main section are shorter than the remaining membranes of the apparatus resulting in the formation of a chamber 46 extending the entire height of the membranes. This chamber may be separated from the compartment 44 by a further screen 47.

The main frame 14 comprises a plurality of withdrawal channels 48, 49, 50, 51 and 52 associated with withdrawal ducts 53, 54, 55, 56 and 57, respectively. Each of the withdrawal channels 48, 49, 50, 51 and 52 extends across the entire width of the main section 14.

The end sections 15, 16, containing electrodes 17 and 18 comprise electrode compartments 58 and 59. Ducts 60 and 61 and 62, 63 serve to supply liquid to and withdraw liquid from the electrode compartments.

In the illustrated form of apparatus, the membranes 34, 35, 36 and 37 of the guard section terminate short of the walls of the guard section to provide a passage for liquid from one guard compartment into another, as indicated at 64, 65, 66 and 67. The guard compartments are numbered 68, 69, 70 and 71, 72, 73, respectively. Further passages 74 and 75 lead from the guard compartment 70 and 73, respectively, into the chamber 46.

Liquid is supplied to the guard compartments 68 and 71 through ducts 76 and 77.

The membranes or barriers are made of highly conductive ion exchange material, such as the Amberlite resins. Methods of making membranes are described in the literature, for example in the article by Wyllie and Patnode, Journal of Physical and Colloid Chemistry, vol. 54, pages 204–226. Examples of suitable ion exchange material are Amberlite IR–120 which is a cation exchange material, and Amberlite IRA–400 which is an anion exchange material.

The barriers may all be of cation exchange material, or they may all be of anion exchange material. Anion barriers may also alternate with cation barriers or ion selective barriers may be combined with neutral barriers or amphoteric barriers.

Materials of high ionic conductivity and high ionic concentration are preferred, particularly polymeric materials, such as the different well-known exchange resins preferably having ionic concentrations of between 2 Normal to 6 Normal in water immersion. Membranes may be made from ion exchange resins, such as any of the aforementioned cationic and anionic Amberlite resins by cementation of resin particles, beads or granules of about .001" to .015" diameter with a water permeable cement of porosity of the order 10 A. to 200 A. pore size. The effective pore size of the resin is preferably 10 A. to 40 A. The resin granules may also be bonded together in a manner well known in the art.

Neutral membranes may be made of a porous material of 10 A. to 1000 A. pore size when immersed in water. Cellophane or resin impregnated porous paper, porous hard rubber, or thermoplastic of a porosity sufficiently high to give an electrolytic conductivity of the order of ½ to ⅕ of that of an ionic solution upon immersion in said solution are satisfactory.

In place of neutral membranes, membranes may be employed which are amphoteric and are composed in a manner similar to the cation or anion exchange resins used by Wyllie, except that the resin beads or granules are either amphoteric or contain both cationic and anionic groups in equivalent quantities, bonded to form a structure of a water content of 20 to 80% upon water immersion. The membrane has a high ionic conductivity as a result of the high ionic concentration of the fluid within the pores. The conductivity of the water immersed neutral membranes is preferably of the order of a 0.1 N to 1.0 N NaCl solution.

An amphoteric resin may be polymerized from a mixture of cation and anion monomer molecules, or from a mixture of cation and anion polymer or chain molecules. It may also be made by cementing together a mixture of small granules of cation and anion exchange resin in equivalent quantities with an electrolytically conductive porous cement with pores of size 10 A. to 500 A. Duolite Zwitterion is a commercially available form of amphoteric resin.

Membrane materials permit shaping into various forms either during the process of manufacture or thereafter. In the first instance, the shaping may be accomplished by molding, in the latter instance by machining.

The membranes may be of unitary structure, that is to say of one piece, or they may be composition membranes in which event an active micro-porous layer is carried by a generally inactive macro-porous carrier or backing, either as a thin layer bonded to the carrier or carried within the pores of the carrier. Such construction is known. For instance the active substance may be polymerized in the pores of a battery separator, forming a layer of a fraction of the thickness of the separator or permeating it throughout.

Membranes are also made by suitably impregnating cellophane or cellulose sheets or tightly woven cellulose cloth with ion exchange material as well known in art.

The several compartments may be left void or they may be filled with a macroporous filler F. The filler material may be inactive or inert such as glass beads or glass fibres, or an ion exchange material may be used, as will later be explained.

Figure 3:
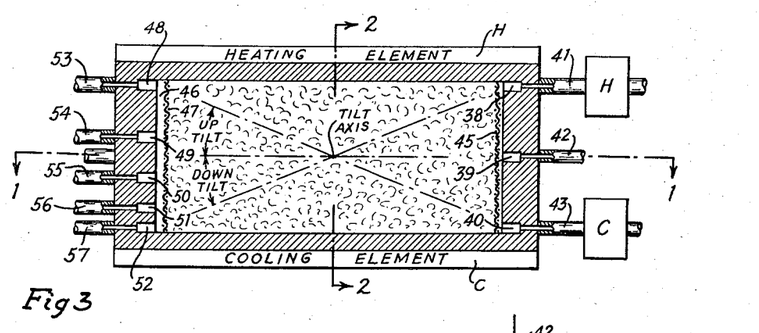
Fig. 3 is a substantially vertical section taken on line 3—3 of Fig. 1.

A heating element H may be applied to the top of the apparatus and a cooling element C to the bottom. The heating element increases the conductivity of the liquid at the top of the apparatus and the cooling element counteracts the heating of the liquid near the bottom, where, during the operation of the apparatus liquid of higher conductivity collects resulting in higher current density and consequent heating by the electric current. The heating and cooling elements H and C counteract the establishment of a higher temperature at the bottom than at the top which would tend to set up convection currents interfering with the formation of fraction layers or zones. The elements H and C even permit maintenance of a raised temperature near the top which is desirable. In place of, or in addition to, the heating and cooling elements associated with the instrument housing, such elements may be provided in the inflow ducts 41, 43 as shown in Figure 3.

Regardless of whether the solutions are conductive or not, heating of the fluid passing through the top of the compartments, or cooling of the fluid passing through the lower portions of the compartments, or both, by heating or cooling of the fluid before or after entry into the apparatus, decreases the specific gravity of the fluid passing through the upper portions with regard to the specific gravity of the fluid passing through the lower portions. Thus the specific gravity gradient between top and bottom becomes larger, resulting in more distinct separation of fractions which then are relatively easily separable. This procedure permits efficient separation of fractions which are normally difficult to separate because of small differences in specific gravity.

The temperature changes so effected are preferably of such order as to produce an outflow temperature of the topmost fractions higher than the outflow temperature of the bottommost fraction, the difference amounting to 60° C. or more. Top temperatures may range from room temperature to boiling point depending on the character of the fraction as well as the composition of the barriers.

Obviously the described heating and cooling is equally advantageous for electro decantation.

The operation on the apparatus is best explained by an example. It may be assumed that a water solution containing 0.1 N KF, 0.3 N NaCl and 0.05 N LiCl is to be fractionated into its components. In this case, all barriers may be anion permeable and cation passage resistant. An electrical potential is applied to the leads 19 and 20 so that lead 19 becomes positive and the electrode 17 becomes the anode. All the compartments are filled with the solution.

Anions from the electrode chamber 59 and the several compartments pass towards the left in the direction of the electrode chamber 58. Passage of the anions through the membranes causes an ionic concentrate to form at the membrane surfaces at which the anions emerge from the membranes into the liquid layers in the compartments. Such concentration layers are formed at the left surface of the membranes of the apparatus of Figure 1 and a dilution layer is formed on the opposite surface of the membranes. They are the result of the concentrating action inherent in the membranes.

It is known that ion exchange materials have fixed electric charges which are immovable and part of the structure of the exchange material. These fixed charges are countered or balanced by a corresponding number of charges of opposite polarity represented by the mobile ions of the ionic liquid which fills the pores. Where the ionic concentration in the pores of ion exchange material is higher than the ionic concentration of the liquid filling the compartments of the apparatus, the membranes perform a concentrating function under the described conditions.

The components of the solution in all the compartments are under the influence of gravity and tend to separate and accumulate in separate vertically spaced fractions as the liquid moves slowly from the inlet chamber 39 through the compartments 44 towards the withdrawal ducts. Given sufficient time, the components arrive at the withdrawal end in horizontal layers arranged in the order of specific gravity. Sufficient time implies that the length of the passage from entrance to exit should be sufficiently long and the rate of flow sufficiently slow to cause the desired degree of separation to take place.

A characteristic of the compartments is that the ratio of concentration between the topmost liquid zone and the bottommost liquid zone in the compartments is considerably greater than the difference in concentration across the compartment, i. e. measured at opposite points of the concentration layer and the dilution layer, respectively. For this reason, it is possible to produce great concentration differences between the outflowing liquids even with membranes of the macroporous type or layers of granular or bead type ion exchange material which are, by their very nature, macroporous.

Figure 1:
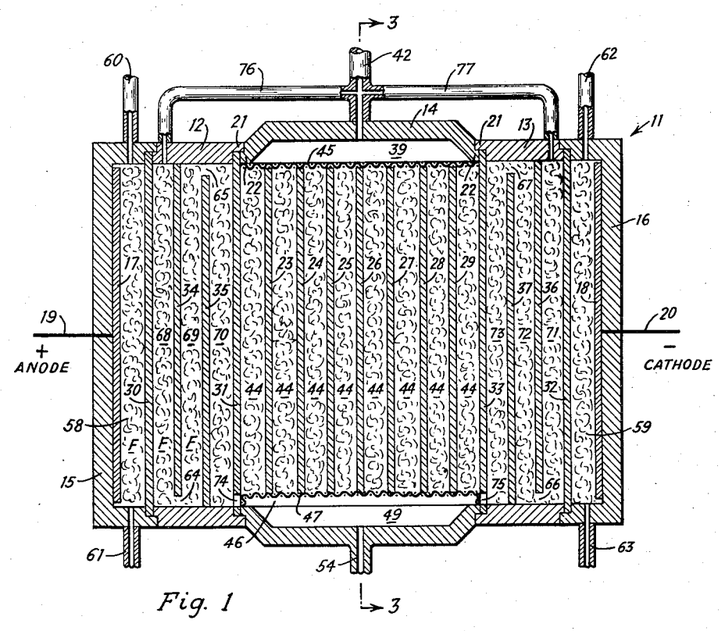
Fig. 1 is a substantially horizontal section through an apparatus embodying the invention, the section being taken on line 1—1 of Fig. 3.
Figure 2:
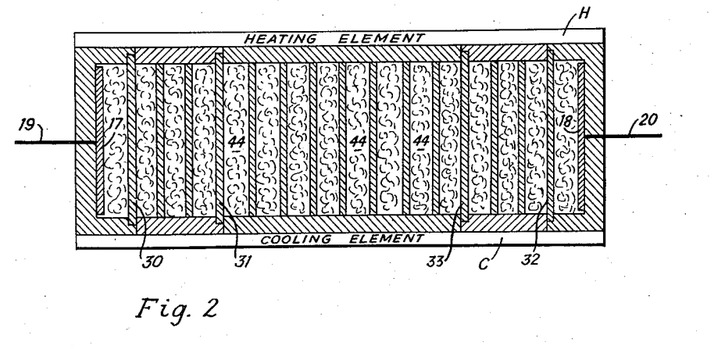
Fig. 2 is a substantially vertical section through the apparatus, the section being taken on line 2—2 of Fig. 3.

The dimensions shown in Figures 1, 2 and 3 are not to scale, particularly the length of the barriers or membranes, measured from entrance to exit, is reduced for convenient illustration. Specific dimensions of apparatus used for experimental purposes are given in the examples further below.

The fractionated liquid is withdrawn through the several vertically spaced withdrawal channels and their associated ducts. The withdrawal is carried out at such a rate that the individual components or combination of components are withdrawn separately.

The component Li is recovered at the top, Na is found near the middle and K is found at the bottom of the compartments.

The withdrawal rates at the withdrawal ducts are so adjusted that the liquid withdrawn through channel 48 and duct 53 contains Li only or predominantly, that duct 55 yields Na only or predominantly and duct 57 yields K cations only or predominantly.

In order to produce sharp separation, it is preferred to withdraw liquid through the intermediate ducts 54 and 56 in such a manner that the liquid withdrawn therethrough contains a certain portion of the fraction above and a certain portion of the fraction below. For example, the withdrawal through duct 54 may be so adjusted that the liquid contains a small quantity of both Li and Na cations. The withdrawal of liquid through the duct 56 is so adjusted that the liquid contains a small quantity of Na and K cations.

Of the anions found within the fractions, F occurs predominantly in the upper fractions and Cl in the lower fractions.

The number of guard compartments between the electrode compartments and the central compartments 44 is so chosen as to result in separation corresponding to the separation taking place in the compartments 44 of the main section. The flow rate through the guard compartments is maintained slow, the minimum flow rate being determined by the necessity to prevent an undue temperature rise in the guard compartments.

Cations leak through the membrane 30 from the electrode compartment 58 and enter the guard compartments 68, 69 and 70. They are fractionated during their passage through the guard compartments 71, 72 and 73 and enter the main flow in fractionated order through membrane 31 and the passage 74. In this manner contamination is prevented which would be present if cations were permitted to pass through, or leak through the membrane bordering the electrode compartment to enter the main flow without proper fractionation.

Anions originating in the solution in the electrode chamber 59 may also be fractionated during their passage through the guard compartments 71, 72, 73 and arrange themselves in layers in the same manner as the ions of the liquid in the main section 14. The anions contained in the liquid in the electrode chamber 59 pass into the guard compartments 71, 72 and 73 and eventually reach the endmost chamber 44 through the membrane 33 or the passage 75. In order to produce a comparable degree of fractionation of the fast moving anions, a greater number of guard compartments 71, 72, 73 is required, for example four times as many guard compartments as the number of guard compartments for the fractionation of cations at the other end.

The chamber 46 communicates with all the compartments 44 of the main section and tends to equalize the rate of flow therethrough.

The apparatus may also be equipped with barriers of cation exchange material and the polarity of the electrodes may be reversed. In that case, the operation of the apparatus is similar as previously described with the exception that cations pass through the membranes freely, while the passage of anions therethrough is impeded.

The preferred spacing of membranes is between ½ and 20 mm.

The number of compartments within the main section may be very large and may number several hundreds or thousands. The number of the guard compartments shown at 68, 69 and 70 may be made large enough to cause the migrating ions to arrive at the main flow in fractionated order.

The compartment 44 may be provided with any number of withdrawal ducts to permit withdrawal of any number of components as well as withdrawal of liquid at intermediate points.

The apparatus is preferably used in a horizontal position, but it may also be tilted to cause the liquid to flow at an upward or downward angle. An upward tilt is desirable where a longer treatment of the heavier fractions is desired. This is the case where the heavy fractions are difficult to separate. A downward tilt is of advantage where the lighter fractions are more difficult to separate than the heavy ones. The angle of tilt may range from 0 to nearly 90 degrees, but preferably no greater an angle than that angle in which the several outlets lie on the same side of the vertical passing through the inflow axis.

Figures 4, 5:
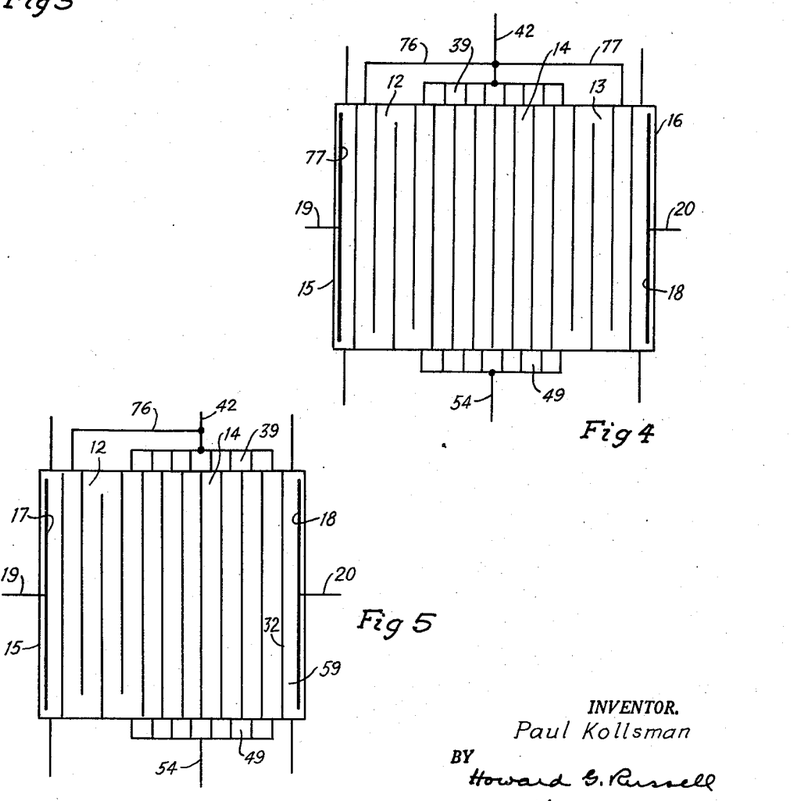
Fig. 4 is a diagrammatic representation of the apparatus of Fig. 1.
Fig. 5 is a diagrammatic representation of a modified form of apparatus.

Figure 4 is a diagrammatic illustration of the apparatus shown in Figure 1 with guard compartments flanking the main section on either side.

Figure 5 illustrates a modified arrangement of the apparatus, the guard section 13 being omitted. This arrangement is permissible where fractionation of the driving ions moving from right to left is not required. In this case, the guard compartments 12 afford protection against contamination by leakage ions. If, on the other hand, the driving ions move from left to right, the guard compartments 12 produce fractionation of the driving ions, but there is no protection against contamination by leakage ions. This is admissible where such contamination is tolerable or negligible.

Figure 6:
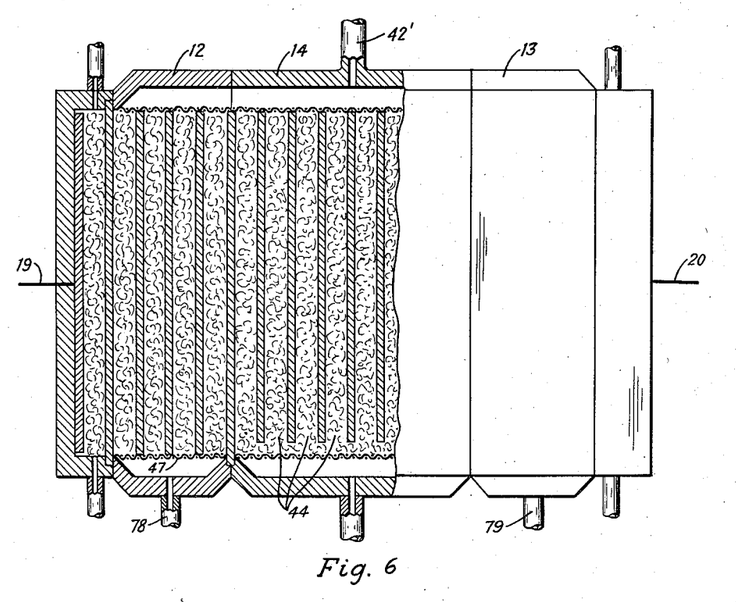
Fig. 6 is a plan view, partly in section, of a modified form of apparatus.

Figure 6 illustrates a modified arrangement in which the flow of liquid passes through the guard compartments as parallel branch flows, in distinction from the series-flow arrangement shown in Figures 1, 4 and 5. In the apparatus of Figure 6, liquid is supplied to the main compartments 44 through inlet ducts 42', but separate withdrawal ducts are provided for the main section 14 and the guard sections 12 and 13. The withdrawal ducts, two of which are indicated at 78 and 79 are also arranged at various horizontal levels as was previously shown in Figure 3. The outflow of the guard compartments may be used separately where a lesser degree of purity or accuracy of separation is required. Where there is no use for the products of the guard compartments, the outflow of the guard compartments may be returned to the apparatus, for example into or through the main supply duct 42'.

The barriers which subdivide the housing of the apparatus into individual compartments may be of any one of different physical forms. They may be membranes, as stated, or layers of suitable granular or bead type material contained between active or inactive permeable walls, such as mesh type screening to hold the material in place. They may also be spacers or fillers lying on both sides or on only one side of a membrane or layer.

As will appear from the discussion of the barrier combinations which follows, layers and membranes may be permeable to ions of one polarity and passage resistant to ions of the opposite polarity, or they may also be permeable to ions of both polarities. Such layers and membranes may be amphoteric, in other words, composed of ion exchange material of both polarities. In such an event they are conductive. They likewise may be macroporous structures of a non-conductive neutral material, such as cellophane, resin impregnated porous paper, porous hard rubber, or fine mesh screening, the porosity being sufficiently high to give an electrolytic conductivity of the order of one-fifth of that of the ionic solution or better, if submerged in the solution.

Figure 15 represents a chart disclosing advantageous combinations of various types of fillers with various types of barriers, it being understood that the latter may be self contained membrane sheets or cemented or uncemented, confined or unconfined layers of ion exchange particles of the particular character set forth.

The filler, as is readily apparent, may be ion conductive or it may be non-conductive.

Conductive fillers may be used for the treatment of conductive as well as non-conductive fluids, but are required for the treatment of non-conductive fluids.

Non-conductive fillers are mainly physical spacers. In this group are glass beads, glass fibres, sand and certain microporous substance such as cellophane chips and granules.

Conductive fillers are ion exchange materials of one or both polarities. Cellophane is not considered a conductive substance for the purpose of this invention. A conductive filler may be combined with a plurality of barriers all of which have the same characteristics, or which are of unlike characteristics and arranged in alternating order.

The filler may be in contact with the surface of only one of the two bordering barriers or it may be in contact with both barriers. If in contact with only one surface, the surface may be the ion intake surface, i. e. the adsorption surface or the ion outlet surface, that is the desorption surface.

The chart indicates whether the filler should be of the same polarity or of the opposite polarity of the barrier or whether it may be amphoteric. In this connection the polarity is considered to be that of the adsorbed ions and not the polarity of the material as such. The chart shows the preferred uses of the various combinations.

Figure 7:
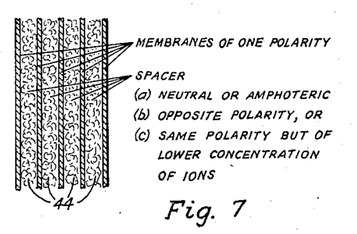
Figs. 7 to 10 are diagrammatic representations of various barrier layer combinations which may be used in the apparatus.

Turning now to the various combinations which produce effective fractionations, Figure 7 illustrates an arrangement in which spaced anionic, cationic or amphoteric membranes form compartments 44 between them. These compartments are filled with a macroporous spacing material or filler. The filler material may be amphoteric, neutral, or it may be of the opposite polarity with respect to the membrane. The screens 45 and 47 (Fig. 1) serve to hold loose layer material in place. The filler may also be composed of an ion exchange material of the same polarity (including amphoteric) but of a different, preferably lower concentration of ions than the membrane or barrier.

Figure 8:
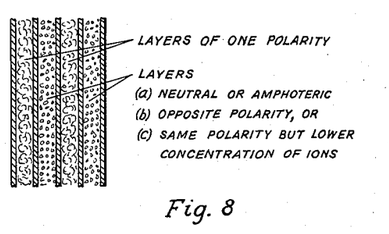

Figure 8 illustrates an arrangement in which dissimilar layers space each other. Certain spaced layers are composed of an ion exchange material of one polarity (anionic, cationic or amphoteric) and the layers between them are either neutral, or ion exchange material of amphoteric, or of opposite polarity of the same polarity (including amphoteric) as the first layers, but of a lower concentration of ions. In all of these cases the layers of one polarity perform the function of the membrane of Figure 7.

Figure 9:
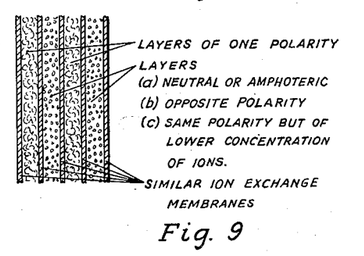

Figure 9 illustrates an arrangement in which layers of one polarity (including amphoteric) alternate with layers of neutral or amphoteric material or material of the opposite polarity or of the same polarity (including amphoteric) but a lower concentration of ions. The several layers are physically separated by membranes or other forms of separators such as screens which are permeable to both ions, i. e. either neutral or amphoteric.

Figure 10:
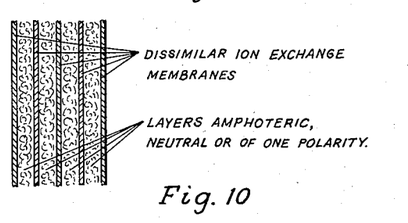

In Figure 10 dissimilar membrances are shown, for example membranes of opposite polarity (including amphoteric), or membranes of the same polarity (including amphoteric), but of different concentration of ions. The spaces between certain or all membranes are filled with a conductive material which is amphoteric, or either anionic or cationic.

If a filler is not to be used in all the spaces, it should preferably be used in the dilution spaces. The filler effectively enlarges the adsorption surfaces of the adjacent membranes.

Figure 11:
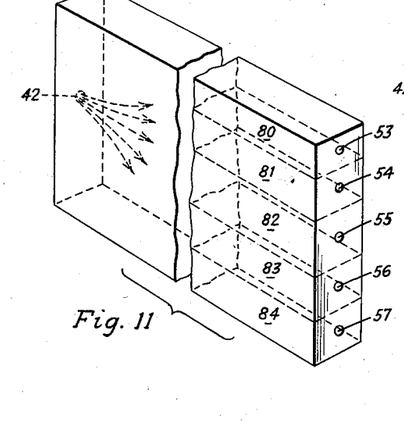
Figs. 11 and 12 are perspective illustrations of optional arrangements of withdrawal ducts.

Figure 11 is a diagrammatic representation of a single compartment having an inflow duct 42 at one end and spaced outflow ducts 53, 54, 55, 56 and 57 at the opposite end for the separate withdrawal of fraction layers 80, 81, 82, 83 and 84.

Figure 12:
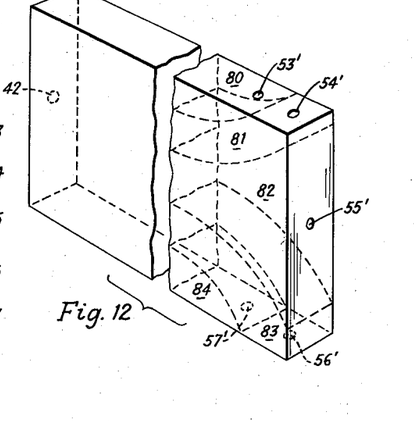

As will be seen from Figure 12, it is not necessary to place the withdrawal duct in the opposite side wall of the compartment, but certain of the outlets may also be in the top and bottom walls as shown at 53', 54', 56' and 57'. The principal requirement is that the withdrawal points are spaced in the plane in which the compartment extends, in the present case the vertical plane, and that the outlets are at such a distance from the inlet to insure that all the fluid particles are under the influence of the electric current for the required period of time. The fraction layers arrange themselves as indicated. The arrangement of Figure 12 is particularly advantageous if the apparatus is tilted.

Figure 13:
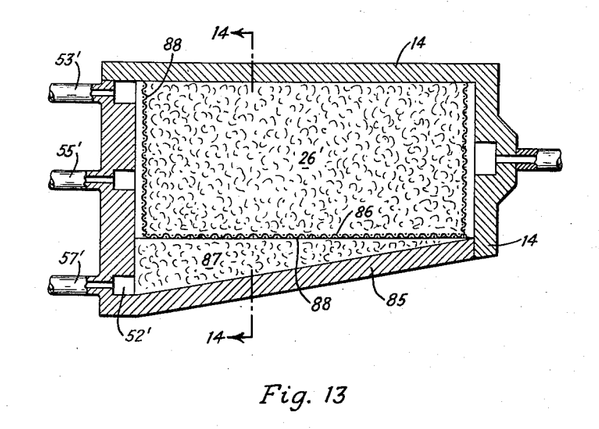
Fig. 13 is a modification of the construction shown in Fig. 3.
Figure 14:
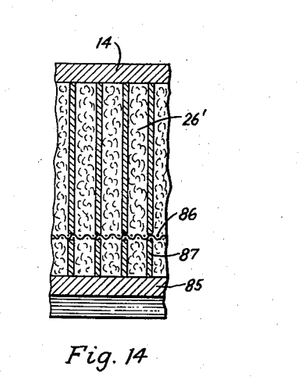
Fig. 14 is a sectional view of the apparatus shown in Fig. 13, the sections being taken in line 14—14 of Fig. 13.

Figure 13 illustrates a modification of the apparatus of Figure 3. This modification includes outlets 53", 55" and 57" and is of particular importance for the treatment of solution of high ionic conductivity. The bottom 85 of the main section is sloped towards the withdrawal duct 57". In order to prevent a major portion of the current from flowing through the liquid volume below the lower edge 86 of the membrane 26", insulating partitions 87 are provided. These partitions extend approximately to the level of the lower edge 86 of the layers or membranes 26" and effectively reduces the power consumption by reducing the path through which current would otherwise flow through the highly conductive ionic concentrate at the bottom 85. The bottom portion of the housing including the partitions 87 may be separated from the remainder of the housing by a screen 88 which holds the layer material in place. The number of partitions 87 may exceed the number of the layers or membranes and they may be thicker than the layers or membranes 26" so as to reduce the thickness of the liquid layers between the partitions to a minimum.

The modification of Figure 13 is suitable for the fractionation of mixtures consisting of easily separable components or deionization of liquids of relatively high ionic concentration, such as sea water. Where, however, the separation of the components is difficult, or where the liquid is to be separated into more than two fractions, the form shown in Figure 3 is preferred, employing the outlet arrangement of either Figure 11 or Figure 12.

A disadvantage of Figure 13 is that the bottom outlet 57" collects fluid particles, some of which have traveled only a short distance under the control of the current and other fluid particles which have traveled a long distance under the influence of the current. In distinction, it should be noted that in the arrangement of Figure 12 all the fluid particles withdrawn through a certain outlet, for example outlet 57' have traveled substantially the same distance within their respective zones (zone 84) and all of them have been under the influence of the current during their travel for substantially the same length of time. The withdrawal of fluid particles immediately after entry into the apparatus and before exposure to the current for a certain length of time is prevented.

Following are examples of fractionation and separation conducted on a laboratory scale, it being understood that the dimensions given are not necessarily the optimum dimensions for large scale commercial operation.

In this description, and in the following examples, certain ion exchange materials are identified by the trade names and symbols by which they are commonly identified in the art. Particulars with regard to the chemical composition of these ion exchange materials are found in the appendix, pages 385 to 388, of the book "Ion Exchange," by F. C. Nachod, Academic Press, New York, 1949.

*Example 1*

*Apparatus.*—Constructed essentially as shown in Figures 1 and 3, but without guard compartments, the apparatus comprising 50 layers of resin beads approximately 0.7 mm. in diameter. Dimensions of each layer: 100 mm. tall, 500 mm. long, 6 mm. thick. Every second layer consisting of cation exchange material IR–120, the remaining layers consisting of anion exchange material IRA-400. Membrane 30 consisting of IRA-400, membrane 32 consisting of IR-120. One central inlet 42 and two outlets 53 and 57. A cellophane film of 0.1 mm. thickness interposed between IR-120 resin beads and IRA-400 beads on the side of the IR-120 facing the cathode.

*Operational data.*—Liquid to be treated: 3 percent NaCl-in-water solution. Inflow into main compartments: 12.5 cc. per second. Flow through each electrode compartment: 12 cc. per second. Current: 8 amps.

*Results.*—Liquid withdrawn at top outlet: 7.5 cc. per second containing 61 mg. of NaCl. Liquid withdrawn at bottom outlet: 5 cc. per second containing 314 mg. NaCl.

Example 2

*Apparatus.*—As used in Example 1, but modified in accordance with Figure 13 with respect to the bottom outlet.

*Operational data.*—Liquid to be treated: 3 percent NaCl-in-water solution. Inflow into main compartments: 12.5 cc. per second. Flow through each electrode compartment: 12 cc. per second. Current: 7.5 amps.

*Results.*—Liquid withdrawn at top outlet: 7.5 cc. per second containing 47 mg. of NaCl. Liquid withdrawn at bottom outlet: 5 cc. per second containing 328 mg. NaCl.

Example 3

*Apparatus.*—Constructed essentially as shown in Figures 1 and 3, but without guard compartments, the apparatus comprising 75 layers of resin beads approximately 0.7 mm. in diameter, the layers being arranged as follows: (from left to right) IRA-400, 3 mm. thick; mixture of equal amounts of IR-120 and IRA-400, 25 mm. thick; IR-120, 3 mm. thick; IRA-400, 3 mm. thick; mixtures of IR-120 and IRA-400, 25 mm. thick, and so forth. All layers 100 mm. tall and 500 mm. long. Membrane 32 consisting of IR-120. One central inlet 42 and the two outlets 53 and 57.

*Operational data.*—Liquid to be treated: hard water with a salt content of one thousand parts per million (p. p. m.). Inflow into main compartments: 50 cc. per second. Flow through each electrode compartment: 25 cc. per second. Current: 3 amps.

*Results.*—Liquid withdrawn at top outlet: 40 cc. per second containing 8 mg. of salts. Bottom outlet: 10 cc. per second containing 42 mg. of salts.

*Comments.*—The amphoteric filler layer serves to increase and extend the adsorption surface of each of the other layers and decreases the resistance of the spaces in which deionization takes place.

Example 4

*Apparatus.*—Details as in Example 1, except for the provision of a central outlet duct 54.

*Operational data.*—Liquid to be treated: a mixture of 50 percent acetone and 50 percent benzene. Each electrode compartment supplied with 1 cc. of 18 percent KCl-in-water solution. Inflow into main compartments: 6 cc. per second. Current: 2 amps.

*Results.*—Liquid withdrawn at top outlets: 1.8 cc. acetone per second, 0.2 cc. benzene per second. Center outlet: 1.1 cc. acetone per second and 0.9 cc. benzene per second. Bottom outlet: 0.1 cc. acetone per second, 1.9 cc. benzene per second.

Example 5

*Apparatus.*—Details as in Example 1.

*Operational data.*—Liquid to be treated: 1 percent sugar-in-water solution supplied to the main compartments at the rate of 5 cc. per second. Each electrode compartment supplied with 1 cc. of 3 percent KCl solution and water per second. Current: 2 amps.

*Results.*—Top outlet: 3.0 cc. per second containing 11 mg. of sugar. Bottom outlet: 2 cc. per second containing 39 mg. of sugar.

Example 6

*Apparatus.*—Constructed essentially as shown in Figures 6 and 3. Main section of the apparatus: 50 layers of IR-120 beads of approximately 0.7 mm. diameter and 50 layers of IRA-400 resin beads of approximately 0.7 mm. diameter, the layers being arranged in alternating order. Guard compartments on the left: 25 layers of IR-120 beads and 24 layers of IRA-400 beads in alternating order. Guard compartments on the right: 25 layers of IRA-400 beads and 24 layers of IR-120 beads in alternating order. Membranes 30 and 31: IRA-400. Membranes 32 and 33: IR-120. Dimension of layers: 100 mm. tall, 50 mm. long, 6 mm. thick. Thickness of membranes: 1 mm. A cellophane film of 0.1 mm. thickness interposed between IR-120 and IRA-400 layers on the IR-120 side facing the cathode. Three vertically spaced outlets.

*Operational data.*—Liquid to be treated: An aqueous solution containing per liter 58 mg. KF and 424 mg. of LiCl. Inflow into main compartments: 5 cc. per second. Inflow into each guard compartment: 1 cc. per second. Inflow into each electrode compartment: 1.2 cc. per second. Current: 2100 ma. Outflows adjusted as follows: Top outflow: 3 cc. per second. Center outflow: 1.2 cc. per second. Bottom outflow: 0.8 cc. per second. Operating time: 200 seconds equivalent to 1000 cc. passing through the main section.

*Results.*—Outflow: Top: 600 cc. containing 49 mg. Li, 31 mg. K, 126 mg. F, 42 mg. Cl. Center: 240 cc. containing 16.5 mg. Li, 78 mg. K, 40 mg. F, 82 mg. Cl. Bottom: 160 cc. containing 4 mg. Li, 281 mg. K, 25 mg. F, 230 mg. Cl.

Example 7

*Apparatus.*—As in Example 6 but tilted 70° about an axis through 19-20 in Figure 1 resulting in an upward flow through the compartments.

*Operational data.*—As in Example 6 but current 1.5 amps.

*Results.*—Top: 600 cc. containing 53 mg. Li, 24 mg. K, 142 mg. F, 33 mg. Cl. Center: 240 cc. containing 13.5 mg. Li, 73 mg. K, 30 mg. F, 92 mg. Cl. Bottom: 160 cc. containing 3 mg. Li, 293 mg. K, 18 mg. F, 230 mg. Cl.

Example 8

*Apparatus.*—Constructed essentially as shown in Figures 1 and 3, but without guard compartments and containing 100 membranes measuring 100 mm. by 50 mm. by 1 mm. and consisting of IR-120. Membranes spaced apart 1 mm. by means of wide mesh Saran screening.

*Operational data.*—Liquid to be treated: 3 percent NaCl-in-water solution. Rate of flow through each electrode compartment: 12 cc. per second. Rate of inflow into main compartments: 12.5 cc. per second. Current: 8 amps.

*Results.*—A. Apparatus operated horizontally. Top outflow: 7.5 cc. per second containing 51 mg. of NaCl. Bottom outflow: 5 cc. per second containing 324 mg. of NaCl.

B. Apparatus tilted downwardly 45°. Top outflow: 7.5 cc. per second containing 36 mg. of NaCl. Bottom outflow: 5 cc. per second containing 339 mg. of NaCl.

C. Apparatus tilted upwardly 60°. Top outflow: 7.5 cc. per second containing 92 mg. of NaCl. Bottom outflow: 5 cc. per second containing 283 mg. of NaCl.

Example 9

*Apparatus.*—Constructed and operated essentially as in Example 8B, except that the membranes are spaced apart so as to leave a space of 5 mm. between them, the spacing being accomplished by Saran screening of 40 mesh size in several super-imposed layers so as to provide a total thickness of 1 mm., the remaining space being filled with a mixture of IR-120 and IRA-400 beads of 0.7 mm. diameter, the filler contacting the membranes on the side facing the anode and contacting the screening on the side facing the cathode.

*Results.*—Top outflow: 7.5 cc. per second containing 26 mg. of NaCl. Bottom outflow: 5 cc. per second containing 349 mg. of NaCl.

*Comments.*—The amphoteric filler in the space in which deionization takes place prevents formation of a polarization zone, i. e. a zone in which extreme ionic dilution takes place with a corresponding increase in resistance.

Example 10

*Apparatus.*—Constructed as in Example 8, but guard compartments added on the anode side in accordance with Figure 5. Main section contains 100 membranes. Guard section contains 10 membranes measuring 100 mm. by 500 mm. by 1 mm. consisting of IR-120. Membranes spaced 5 mm., the 5 mm. space being occupied by a spacer of 1 mm. thickness composed of Saran screening and a filler of 4 mm. thickness of beads of 0.7 mm. diameter of IR-120, the filler contacting the membranes on the sides facing the anode.

*Operational data.*—Liquid to be treated: an aqueous solution containing 7.46 g. of KCl and 4.24 g. of LiCl per liter. Flow through main compartments: 4.5 cc. per second. Flow through each electrode compartment: 2 cc. per second. Current: 1 amp. Flow through guard compartment 0.5 cc. per second. Inflow into main compartments divided into two equal branches as by ducts 41, 43 the top inflow being 60° C., the bottom inflow being 20° C.

*Results.*—Top outflow: 3 cc. per second. Center outflow: 1.2 cc. per second. Bottom outflow: 0.8 cc. per second. Time of operation: 200 seconds with the following yields: Top outflow: 600 cc. containing 3.05 g. LiCl and 0.49 g. KCl. Center outflow: 240 cc. containing 0.88 g. LiCl and 1.53 g. KCl. Bottom outflow: 160 cc. containing 0.31 LiCl and 5.44 g. KCl.

*Comments.*—The filler layer of IR-120 granules acts as an extension of the ion intake surface of the cation membranes, resulting in a reduced current density per effective unit area of the ion intake surface.

Example 11

*Apparatus.*—Constructed as in Example 8 but guard compartments added on the anode side in accordance with Figure 5. Membranes in the main section consisting of IRA-400 measuring 100 mm. by 500 mm. by 1 mm., membranes spaced 2 mm. apart by wide-mesh Saran screening. 11 guard compartments formed by 10 membranes IRA-400.

*Operational data.*—Liquid to be treated: An aqueous solution containing per liter 7.46 g. KCl and 4.24 g. LiCl. Flow through main compartments: 4.5 cc. per second. Flow through each guard compartment: 0.25 cc. per second. Flow through each electrode compartment: 2 cc. per second. Current: 1100 ma.

*Results.*—Top outflow: 3 cc. per second. Center outflow: 1.2 cc. per second. Bottom outflow: 0.8 cc. per second. Time of operation: 200 seconds with the following yields: Top outflow: 600 cc. containing 2.8 g. LiCl and 0.61 g. KCl. Center outflow: 240 cc. containing 1.03 g. LiCl and 1.58 g. KCl. Bottom outflow: 160 cc. containing 0.39 g. LiCl and 5.2 g. KCl.

Example 12

*Apparatus.*—Constructed essentially as in Example 11, except as follows: Membranes spaced 3 mm., the space being occupied by a 1 mm. layer of Saran screening of 40 mesh and a 2 mm. layer of a filler consisting of beads of 0.7 mm. diameter of IRA-400, the filler contacting the membranes on the sides facing the anode.

*Operational data.*—As in Example 11 except current: 1500 ma.

*Results.*—Flow rate and time as in Example 11. Yields: Top outflow: 600 cc. containing 3.1 g. LiCl and 0.48 g. KCl. Center outflow: 240 cc. containing 0.81 g. LiCl and 1.88 g. KCl. Bottom outflow: 160 cc. containing 0.33 g. LiCl and 5.1 g. KCl.

*Comments.*—The filler granules act as an extension and enlargement of the anion membranes on the ion exit side (desorption side) resulting in decrease of current density per area unit, or reduced ion flow per surface area. At the exit side an ion concentration forms. The reduced current density, due to employment of the filler results in a reduction of the ion concentration in the liquid contacting the desorption surface and a corresponding reduction of ionic leakage.

Example 13

*Apparatus.*—Constructed as in Example 11, except for 5 mm. spacing of all membranes, the spaces being filled with IR-120 beads of 0.7 mm. diameter.

*Operational data.*—Same as in Example 11 except current: 1200 ma.

*Results.*—Outflow rates as in Example 8. Yields: Top outflow: 600 cc. containing 3.2 g. LiCl and 0.46 g. KCl. Center outflow: 240 cc. containing 0.75 g. LiCl and 1.7 g. KCl. Bottom outflow: 160 cc. containing 0.29 g. LiCl and 5.3 g. KCl.

*Comments.*—The cationic filler provides a highly conductive path for the cations to be fractionated. As a result the cations reach the final fractionated condition more readily.

Example 14

*Apparatus.*—Constructed essentially in accordance with Figures 1 and 3 but without guard compartments, the apparatus comprising, in alternating sequence, 51 membranes of IRA-400, ½ mm. thick measuring 100 mm. by 500 mm. and 50 layers of IR-112, 0.7 mm. beads, the layers measuring 100 mm. by 500 mm. by 5 mm. Cation drive.

*Operational data.*—Liquid to be treated: A mixture of 50 percent acetone and 50 percent benzene. Flow through each electrode compartment: 2 cc. per second of a saturated LiCl-in-water solution. Flow through main compartment: 6 cc. per second acetone and benzene mixture. Current: 2 amps.

*Results.*—Top: 1.9 cc. acetone and 0.1 cc. benzene. Center: 0.95 cc. acetone and 1.05 cc. benzene. Bottom: 0.15 cc. acetone and 1.85 cc. benzene per second.

Example 15

*Apparatus.*—Similar to that of Example 12 except for replacement of the anion membranes by cation membranes, combined with weak cationic layers, as follows: 51 membranes IR-120 measuring 100 mm. by 500 mm. by 1 mm. 50 glauconite layers of a thickness of 10 mm. of glauconite pebbles 2 mm. diameter.

*Operational data:*—Liquid to be treated: A mixture consisting of 50 percent acetone and 50 percent benzene. Flow through electrode compartments: a saturated tetraethylammonium chloride-in-water solution supplied at the rate of 2 cc. through each electrode compartment. Current: 800 ma. Supply of mixture to main compartments: 6 cc. per second.

*Results.*—Top: 1.9 cc. acetone, 0.1 cc. benzene. Center: 0.98 cc. acetone, 1.02 cc. benzene. Bottom: 0.12 cc. acetone, 1.88 cc. benzene per second.

Example 16

*Apparatus.*—Similar to that of Example 12 except for replacement of the anion membranes by cation membranes, combined with cationic layers as follows: 51 membranes of IR–120 measuring 100 mm. by 500 mm. by 1 mm.; 50 layers of 10 mm. thickness of fuller's earth granules of 1 mm. diameter.

*Operational data.*—Liquid to be treated: A mixture consisting of 50 percent acetone and 50 percent benzene. Flow through electrode compartments: A saturated LiCl-in-water solution supplied at the rate of 2 cc. through each electrode compartment. Current: 900 ma. Supply of mixture through the main compartments: 6 cc. per second.

*Results.*—Top: 1.85 cc. acetone, 0.15 cc. benzene per second. Center: 0.95 cc. acetone, 1.05 cc. benzene per second. Bottom: 0.20 cc. acetone, 1.80 cc. benzene per second.

Example 17

Apparatus and operational data identical with that of Example 11 except for replacement of the fuller's earth granules by sulfonated coal granules 1 mm. diameter. Current: 1200 ma.

*Results.*—Top: 1.8 cc. acetone, 0.2 cc. benzene per second. Center: 0.95 cc. acetone, 1.05 cc. benzene per second. Bottom: 0.25 cc. acetone, 1.75 cc. benzene per second.

Example 18

*Apparatus.*—Constructed as shown in Figure 1 with a layer arrangement as shown in Figure 9. Apparatus comprising 100 layers of IR–120 beads of 0.7 mm. diameter. Dimensions of layers: 100 mm. tall, 500 mm. long, 10 mm. thick. Layers separated by 1 mm. separators consisting of layers of 40 mesh Saran screening. Guard compartments are formed by eleven similar layers and separators.

*Operational data.*—Liquid to be treated: An aqueous solution containing per liter: 7.46 g. of KCl and 4.24 g. of LiCl. Flow through main compartments: 4.5 cc. per second. Flow through each guard compartment: 0.5 cc. per second. Flow through each electrode compartment: 2 cc. per second. Current: 800 ma.

*Results.*—Top outflow: 3 cc. per second. Center outflow: 1.2 cc. per second. Bottom outflow: 0.8 cc. per second. Time of operation: 200 seconds with the following yields: Top outflow: 600 cc. containing 2.9 g. LiCl and 0.58 g. KCl. Center outflow: 240 cc. containing 1.01 g. LiCl and 1.64 g. KCl. Bottom outflow: 160 cc. containing 0.27 g. LiCl and 5.17 KCl.

*Comments.*—The Saran screening acts as a mechanical separator preventing direct contact between the granules of different layers.

Example 19

Apparatus as described in Example 16.

*Operational data.*—Fluid to be treated: A gaseous mixture of 13 mg. of acetone per liter of air supplied at rate of 50 cc. per second. Flow through electrode compartments: a 1% solution of tetraethylammonium chloride in acetone supplied at rate of 2 cc. per second through each electrode compartment. Current: 400 ma. Time of operation: 150 seconds. Pressure: atmospheric.

*Results.*—Top outflow: 2500 cc. containing 12 mg. of acetone. Center outflow: 2500 cc. containing 24.5 mg. of acetone. Bottom outflow: 2500 cc. containing 61 mg. of acetone.

Example 20

Apparatus same as in Example 16.

*Operational data.*—A gaseous mixture of 21 mg. of water per liter of air supplied at rate of 50 cc. per second. Flow through electrode compartments: A saturated solution of LiCl in water supplied at rate of 2 cc. per second through each electrode compartment. Current: 400 ma. Time of operation: 150 seconds. Pressure: atmospheric.

*Results.*—Top outflow: 2500 cc. containing 84 mg. of water. Center outflow: 2500 cc. containing 44.5 mg. of water. Bottom outflow: 2500 cc. containing 29 mg. of water.

Example 21

Apparatus constructed as that of Example 7 except that membranes consist of mixture of equal volumes of IR–120 and IRA–400.

*Operational data.*—Liquid to be treated: 3% NaCl water solution. Flow through main compartment: 12.5 cc. per second. Flow through each electrode compartment: 2 cc. per second. Current: 9.5 amps.

*Result.*—Top outflow: 7.5 cc. per second containing 77 mg. of NaCl. Bottom outflow: 5 cc. per second containing 298 mg. of NaCl. (Bottom withdrawal as shown in Figure 13.)

Example 22

Apparatus constructed according to Figures 1 and 3, but without guard compartments, and comprising 50 layers of a mixture of equal quantities of beads of 0.7 mm. diameter of IR–120 and IRA–400. Dimensions of layers: 100 mm. tall by 500 mm. long by 25 mm. thick. Layers separated by 2 mm. 40 mesh Saran screening and 0.1 mm. cellophane sheets. End membranes amphoteric made from mixture of equal quantities of IR–120 and IRA–400, 1 mm. thick.

*Operational data.*—Liquid to be treated: hard water with a salt content of 1000 p. p. m. Inflow into main compartment: 50 cc. per second. Flow through each electrode compartment: 25 cc. per second. Current: 3 amps.

*Results.*—Liquid withdrawn from top outlet: 40 cc. per second containing 9 mg. of salts and from bottom outlet: 10 cc. per second containing 41 mg. of salts.

Example 23

Apparatus similar to that of Example 16 except for replacement of all membranes by amphoteric membranes made from a mixture of equal volumes of IR–112 and IRA–400.

*Operational data.*—Liquid to be treated: A mixture of 50% acetone and 50% water. Electrolyte circulates through electrode compartments. Electrolyte: A saturated solution of tetraethyleneammonium bromide. Flow through main compartments: 5 cc. per second of acetone water mixture. Flow through each electrode compartment: 2 cc. per second of electrolyte. Current: 1.5 amps.

*Results.*—Top outflow: 1.8 cc. acetone, 0.2 cc. water. Center outflow: 0.9 cc. acetone, 1.1 cc. water. Bottom outflow: 0.3 cc. acetone, 1.7 cc. water.

*Comments.*—A mixture of components of different dielectric constants or of different degrees of hydrophilic or hydrophobic character are separated into its components. A similar result may be obtained by using an apparatus according to Example 21 or 22 and addition of a cationic or anionic surface active agent to the fluid to make it electrolytically conductive. In such a case the hydrophobic ions transport preferentially the more hydrophobic component and the hydrophilic ions transport the more hydrophilic component to the membranes in opposite directions.

Treatment of gaseous mixtures is advantageously carried out at pressures above atmospheric pressure due to the ability of the layer materials to adsorb larger quantities of constituents at higher pressures. If, on the other hand, operation takes place at pressures less than atmospheric, the differential adsorption ability of the material for different constituents of the gas mixture is improved, in other words the material is more selective.

Treatment of gaseous mixtures may also take place within a wide temperature range, such as +100° C. to —50° C. or less, particularly within a range in which components having the lowest boiling point are partially or completely recoverable in a liquid state.

Following is a list giving, for the purpose of example, advantageous combinations of barriers and filler material.

| Barriers | Filler in granules or bead form (10-50 mesh) |
| --- | --- |
| *Combination I* | |
| 1 mm. layers of IR-120 or Dowex 50—16% crosslinking or Duolite C-25 or C-60 or Chempro C-20. | IR-100 or Duolite C-10 or Dowex 50—2% crosslinking or sulfonated coal or alumino silicates or fuller's earth or ZeoDur or Glauconite or Decalso Duolite resinous adsorbent S-30. |
| *Combination II* | |
| 1 mm. layers of IRA-400 or Duolite A-41 or A-44 or Dowex 1—2% crosslinking. | Duolite C-10, 10 mm.; IR-120, 10 mm. thick; Dowex 50, 10 mm. thick; ZeoCarb, 20 mm. thick; fuller's earth, 30 mm. thick; Decalso, 30 mm. thick; ZeoDur, 30 mm. thick. |
| *Combination III* | |
| 2 mm. layers of IR-120 or Duolite C-10. | 2-10 mm. layers of Duolite adsorbent resin S-30 or silica gel of pH>7.0 or Alumina or Bentonites or Clays or fuller's earth Glauconite. |
| *Combination IV* | |
| 1-2 mm. layer of a mixture of IR-120 and IRA-400. | 2-10 mm. layers of fuller's earth or ZeoDur or Decalso or Sulfonated coal or Dowex 50—2% crosslinking or Alumino silicates or Duolite resinous adsorbent S-30. |
| *Combination V* | |
| Cellophane | 5 mm. layers of Duolite C-10 or IR-120 or ZeoCarb or ZeoDur or Decalso or fuller's earth or Alumino silicates. |
| *Combination VI* | |
| 3 mm. layers of IRA-120, Duolite C-10 or Duolite C-60 or Dowex 50—2% crosslinking or fuller's earth. | 3 mm. layers of IRA-400, Duolite A-44 or Duolite A-10 or Dowex 1—2% crosslinking or Alumina. |
| *Combination VII* | |
| 2 mm. layers of a Mixture of IR-120 and IRA-400 or of Duolite C-10 and A-70 or of Dowex 50—8% crosslinking and Dowex 1—40% crosslinking. | 2 mm. layers of a Mixture of Dowex 50—2% crosslinking and Dowex 1—2% crosslinking or of Alumina or fuller's earth or Glauconite or Bentonite or Silica gel or Duolite resinous adsorbent S-30 or Duolite Zwitterion. |

Following is a list of ion exchange material of both organic and inorganic type which may be used in practicing the invention.

*Cationic exchangers—organic—strongly acid.*—Amberlite IR-120, Dowex 50, Dowex 30, Amberlite IR-112, Amberlite IR-105, Amberlite IR-100, Zeo-Karb, sulfonated coal and carbons, Dowex 50 in various degrees of crosslinking ranging from 16% to 1%, Duolite C-10, Duolites C-60, C-61, C-65.

Weakly acid ion exchangers include Amberlite IRC-50 and Permutit 216, Duolites CS-100, CS-101 and Duolite resinous adsorbent S-30. Weak acid type exchangers are preferably used at high pH, such as pH 7 and pH 11.

*Inorganic.*—Natural and synthetic alumino silicates, Zeolites such as montmorillonite, kaolinite, glauconite, Permutit, Decalso, Zeo-Dur, different clays, bentonites, silicates, fuller's earth, silica gel at high pH and the like of different pore size and porosities.

*Anionic exchangers—organic—strongly basic.*—Amberlite IRA-400, Dowex 1 in various degrees of crosslinking, Duolites A-40, A-41, A-44.

Weakly basic exchangers include Amberlite IR-4B, Amberlite IR-45 and Duolite A-3, A-7, A-6. Weak base type exchangers are preferably used at low pH, such as pH 2 to pH 6, particularly in aqueous solutions of less than 0.2 N ionic concentration.

Among the inorganic anionic exchange materials are hydrated alumina, magnesia, heavy metal silicates, clays and bentonites.

Amphoteric exchangers may consist of mixtures of cationic and anionic materials. These may be resinous synthetic or natural. An example of a commercially available amphoteric ion exchange material is Duolite Zwitterion.

In an apparatus employing layers or membranes of ion exchange material of high ionic concentration of the order of 0.5 N and higher (considering the ions in dissociated form), as are commonly present in the ion exchange resins, the operating potential per compartment is preferably maintained below the electrolytic decomposition potential of the solution. An operating potential so chosen positively prevents the formation of electrical decomposition products of the solution at the membrane surfaces, including the formation of gas such as hydrogen, chlorine, oxygen. Such gases, if present, interfere with the formation of the fraction zones.

By way of example the decomposition potential of NaCl or HCl in water ranges between 1.4 and 1.7 volts depending on the normality of the solution. Accordingly in an apparatus containing one hundred compartments the potential is preferably maintained below 140 to 170 volts. This figure does not include the electrode compartment voltage of approximately 1.7 to 2 volts.

In the fractionation of driving ions which are difficult to separate due to the small differences in their migration velocities the potential per compartment may be reduced and be of the order of 0.1 volt. It is of the order of the difference of the decomposition potentials of the different components in solution. Assuming, for example, the decomposition potentials are 1.6 and 1.4 respectively, then the operating potential per compartment is preferably of the order of 0.2 volt or less. Such differences in the decomposition or plating potentials or voltages of ions in solution are known in polarographic and electrolytic analysis.

The number of compartments employed may range up to one or several thousands and is preferably greater than the electrolytical decomposition potential of the electrolyte in the electrode compartments divided by the difference in decomposition potential of the solution. Thus if the decomposition potential of the electrolyte at the electrodes is 1.7 v. and if the difference in the decomposition potentials of the solution ions is 0.2, the number of compartments is preferably in excess of $$\frac{1.7}{0.2} = 9$$

In the operation of the apparatus a pressure difference, due to flow, is preferably maintained between the liquid inflow and the liquid outflow sufficient to prevent mixing of the liquid volumes entering and leaving the chambers.

Mixing tends to occur because a liquid fraction of high specific gravity collecting at the bottom of the apparatus near the outflow tends to flow back towards the inflow. Backflow is prevented by maintenance of a sufficient pressure difference, between inflow and outflow, which pressure difference also produces the flow through the apparatus.

The desirable pressure drop should be greater than the difference in pressure exerted by two columns of liquid of different specific gravity withdrawn at two spaced outlet ports, the heights of the two columns to be determined as follows: The mean volumetric outflow rate of the liquids withdrawn from the two ports is divided by the total volumetric outflow rate of the liquids flowing from all the outlet ports and the quotient so obtained is multiplied by the height of the compartment. The following figures may serve as an illustrative example: Outflow 1: 5 cc. per second. Outflow 2: 7 cc. per second. Mean outflow $$\frac{5+7}{2}=6 \text{ cc. per second}$$

Total outflow from three outlets: 20 cc. per second. Height of the compartment 100 mm. Column height:

$$\frac{6}{20}\times 100 = 30 \text{ mm.}$$

Specific gravity outflow 1: 1.15. Specific gravity outflow 2: 1.05. Pressure difference=$30\times 1.15 - 30\times 1.05 = 30\times 0.1 = 3$ mm. of water column.

If the apparatus is used for the treatment of liquids at relatively high current densities capable of producing substantial polarization at the membrane surfaces a minimum flow rate is preferably maintained sufficient to reduce the polarization to a tolerable amount. Such velocities are within the range of 1 mm. per second to 20 cm. per second depending on the size of the apparatus and the width of the compartments. For average size apparatus this is readily accomplished by maintaining a pressure difference, solely due to flow, between the inflow end and the outflow end of the compartments, the pressure difference to be greater than the pressure exerted by a column of fluid mixture of a height equal to the thickness of the compartment.

The aforementioned pressure difference is measured at points $p_1$ and $p_2$ adjacent the entrance and exit screens as indicated in Figure 3.

What is claimed is:

1. An apparatus for the separation under the influence of an electric current and an accelerating force, including gravitation and centrifugal force acceleration, of different components of a fluid mixture, the apparatus comprising, a housing having a top, bottom, ends and sides; a pair of spaced electrodes in said housing; a plurality of spaced, substantially parallel barriers of an ion exchange material of a certain polarity, said material being more repellent to ions of said certain polarity than to ions of the opposite polarity, said spaced barriers lying substantially in the direction of the accelerating force and subdividing the space between said electrodes into separate fluid compartments; fluid supply means at one side of the housing for simultaneously feeding fluid to be fractionated into a plurality of adjacent compartments; fluid withdrawal means at the opposite side of the housing for withdrawing fluid from said compartments, said fluid withdrawal means including separate ducts and fluid entry ports in said compartments from which ports said ducts extend, said ports in each compartment being spaced from said fluid supply means and from one another by being located on vertically fanned-out radii of different angular inclination extending from said supply means so as to receive fluid from separate strata disposed at different levels in said compartments.

2. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of spaced substantially parallel layers of an ion exchange material of a certain polarity, said material being more repellent to ions of said certain polarity than to ions of the opposite polarity, said spaced layers being disposed upright in said housing and transverse to the path of an electric current flowing from one electrode to the other, said spaced layers subdividing the space between said electrodes into separate compartments; fluid supply means at one side of the housing for simultaneously feeding liquid to be fractionated into a pluarity of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

3. An apparatus for the separation of ionic constituents of a certain polarity of compounds in solution under the influence of an electric current and gravity, the apparatus comprising a housing having a top, bottom, ends and sides; a pair of horizontally spaced electrodes in said housing; a plurality of spaced substantially parallel macroporous layers of particles of an ion exchange material of said certain polarity, said material being more repellent to ions of said certain polarity than to ions of the opposite polarity, said spaced layers being disposed upright in said housing, transverse to the path of an electric current flowing from one electrode to the other, said spaced layers defining compartments in said housing; supply means at one side of the housing for supplying liquid to be fractionated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different inclination extending from said supply means, so as to receive liquid from separate strata disposed at different levels in said compartments between top and bottom of the housing, whereby fractions collecting in such strata under the influence of gravity may be separately withdrawn.

4. An apparatus for the separation of ionic constituents of a certain polarity of compounds in solution under the influence of an electric current and gravity, the apparatus comprising a housing having a top, bottom, ends and sides; a pair of horizontally spaced electrodes in said housing; a plurality of substantially parallel macroporous layers of an ion exchange material of said certain polarity, said material being more repellent to ions of said certain polarity than to ions of the opposite polarity, said layers being disposed upright and transverse to the path of an electric current flowing from one electrode to the other; ion permeable spacers between said layers, said layers and spacers defining compartments in said housing through which compartments liquid may flow; liquid supply means at one side of the housing for supplying liquid to be fractionated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said fluid supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

5. An apparatus as set forth in claim 4 in which said spacers are layers comprising particles of an ion exchange material of the opposite polarity, said material being adsorbent of, and permeable to, ions of said certain polarity.

6. An apparatus as defined in claim 4 in which said spacers are porous sheets permeable to ions.

7. An apparatus as defined in claim 4 in which the spacers are membranes of an ion exchange material of opposite polarity, said membranes being permeable to ions of said certain polarity.

8. An apparatus for the separation of components of compounds in solution under the influence of an electric current and gravity, the apparatus comprising a housing having a top, bottom, ends and sides; a pair of horizontally spaced electrodes in said housing; a plurality of substantially parallel macroporous layers of particles of an ion exchange material of said certain polarity containing a certain concentration of ionic groups of said polarity, said material being more repellent to ions of said certain polarity than to ions of the opposite polarity, said layers being disposed upright and transverse to the path of an electric current flowing from one electrode to the other; spacers between said layers, said spacers being also layers of particles of an ion exchange material of said certain polarity, but of lower concentration of ionic groups of said polarity than said first named layers, said first named layers and said spacer layers defining compartments in said housing through which compartments liquid may flow; supply means at one side of the housing for supplying liquid to be fractionated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

9. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of substantially parallel spaced membranes of an ion exchange material of said certain polarity, said membranes being more passage resistant to ions of said certain polarity than to ions of the opposite polarity, said spaced membranes being disposed upright and transverse to the path of an electric current flowing from one electrode to the other, said spaced membranes forming compartments in said housing through which compartments liquid may flow; supply means at one side of the housing for admitting liquid to be fractionated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

10. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of substantially parallel spaced membranes of two types arranged in alternating order, the one type consisting of ion exchange material of said certain polarity, said one type of membrane being permeable to ions of the opposite polarity and passage resistant to ions of said certain polarity, the membranes of the other type consisting of ion exchange material of said opposite polarity and being passage resistant to ions of said opposite polarity, said membranes being disposed upright and transverse to the path of an electric current flowing from one electrode to the other, said spaced membranes subdividing said housing into compartments through which liquid may flow; supply means at one side of the housing for admitting liquid to be fractionated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

11. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of substantially parallel spaced membranes of two types arranged in alternating order, the one type consisting of ion exchange material of said certain polarity, said one type of membrane being permeable to ions of the opposite polarity and passage resistant to ions of said certain polarity, the membranes of the other type consisting of ion exchange material of said opposite polarity and being passage resistant to ions of said opposite polarity, said membranes being disposed upright and transverse to the path of an electric current flowing from one electrode to the other, said spaced membranes subdividing said housing into compartments through which liquid may flow, there being main compartments and guard compartments, said guard compartments lying between said main compartments and the electrode of said certain polarity; first supply means at one side of the housing for admitting liquid to be fractioned into said main compartments; second supply means for admitting liquid into said guard compartments; fluid withdrawal means at the opposite side of the housing, said fluid withdrawal means including at least two separate withdrawal ducts and fluid entry ports in each of said compartments from which port said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn; and discharge means for discharging liquid from said guard compartments.

12. An apparatus as set forth in claim 11 in which the supply means for said main compartments and said guard compartments are joint, and in which the liquid supplied to the guard compartments flows through the guard compartments in parallel flow.

13. An apparatus as set forth in claim 11 in which the second supply means discharges into a guard compartment adjacent the respective electrode compartment, and in which the guard compartments lie in series so that the liquid supplied to the guard compartments traverses the guard compartments, one after the other, in series flow.

14. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of spaced substantially parallel layers of an ion exchange material of a certain polarity, said material being more repellent to ions of said certain polarity than to ions of the opposite polarity, said spaced layers being disposed upright in said housing and transverse to the path of a current flowing from one electrode to the other, said spaced layers subdividing said housing into separate compartments through which liquid may flow, there being electrode compartments containing said electrodes, central compartments, and guard compartments between said central compartments and said electrode compartments; liquid supply means for said electrode compartments; liquid discharge means for said electrode compartments; liquid supply means for said guard compartments; liquid discharge means for said guard compartments; supply means at one side of the housing for admitting liquid into said central compartments; fluid withdrawal means for withdrawing fluid from the central compartments at the other side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

15. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of spaced substantially parallel layers of an ion exchange material of a certain polarity, said material being more repellent to ions of said certain polarity than to ions of the opposite polarity, said spaced layers being disposed upright in said housing and transverse to the path of a current flowing from one electrode to the other, said spaced layers subdividing said housing into separate compartments; supply means at one side of the housing for simultaneously feeding liquid to be fractionated into a plurality of adjacent compartments; fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn; and thermal means for heating the top of said housing.

16. An apparatus for the separation under the influence of an electric current and gravitational accelerating force of different ionic constituents of a certain polarity of a liquid mixture, the apparatus comprising, a housing having a top, bottom, ends and sides; a pair of horizontally spaced electrodes in said housing; a plurality of spaced substantially parallel layers of an ion exchange material of a certain polarity, said material being more repellent to ions of said certain polarity than to ions of the opposite polarity, said spaced layers being disposed upright in said housing and transverse to the path of an electric current flowing from one electrode to the other, said spaced layers subdividing said housing into separate compartments; supply means at one side of the housing for simultaneously feeding liquid to be fractionated into a plurality of adjacent compartments; fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii having different angular inclination extending from said supply means so as to receive liquid from separate strata disposed at different levels in said compartments between top and bottom of the housing, whereby fractions collecting in such strata under the influence of gravity may be separately withdrawn; and thermal means for cooling the bottom of said housing.

17. A process for fractionating an ionic liquid mixture into its components which comprises, confining the mixture between substantially vertical spaced fluid barriers of ion exchange material passage resistant in different degrees to different components of the mixture, said barriers forming lateral boundaries of liquid compartments; passing an electric current substantially at right angles to said barriers through said barriers and the liquid therebetween in a substantially horizontal direction; passing said liquid mixture through said compartments in a generally horizontal direction, and substantially at right angles to the path of the current, from a point of inflow at one end of the compartments toward the opposite end; withdrawing liquid near the other end from separate horizontal liquid strata; and transferring heat to counteract a relative increase in temperature by the electric current within the lower strata with respect to the higher strata.

18. A process for fractionating an ionic fluid mixture into its components which comprises, confining the mixture between substantially parallel spaced semi-permeable fluid barriers of ion exchange material passage resistant in different degrees to different components of the mixture, said barriers forming lateral boundaries of fluid compartments; passing an electric current through said barriers and the fluid therebetween in a direction substantially at right angles to said barriers; subjecting said fluid and said barriers to a mechanical accelerating force, said force acting substantially parallel to the barriers; passing said fluid mixture by flow in a general direction of the planes parallel to the barriers, and substantially at right angles to the direction of the electric current, from a point of inflow at one end of the compartments towards the opposite end of the compartments; and withdrawing fluid at spaced points of the same compartments, said points being located on vertically fanned-out radii extending from said inflow, each of said radii having a different angular inclination.

19. A process for fractionating an ionic fluid mixture into its components which comprises, confining the mixture between substantially parallel spaced semi-permeable fluid barriers of ion exchange material passage resistant in different degrees to different components of the mixture, said barriers forming lateral boundaries of fluid compartments; passing an electric current through said barriers and fluid in a direction substantially at right angles to said barriers; subjecting said fluid and said barriers to a mechanical accelerating force, said force acting substantially parallel to the barriers; passing said fluid mixture by flow in a general direction parallel to the planes of the barriers, and substantially at right angles to the direction of the electric current, from a point of inflow at one end of the compartments towards the opposite end of the compartments; withdrawing fluid at points of outflow located on vertically fanned-out radii of different angular inclination extending from said inflow; and simultaneously transferring heat to counteract an increase in temperature by the electric current within the strata of greater electrical conductivity with regard to strata of lower electrical conductivity.

20. An apparatus for the separation of components of compounds in solution under the influence of an electric current and gravity, the apparatus comprising a housing having a top, bottom, ends and sides; a pair of horizontally spaced electrodes in said housing; a plurality of substantially parallel macroporous layers of particles of an ion exchange material of a certain concentration with respect to ions of a certain polarity, said layers being disposed upright and transverse to the direction of an electric current flowing from one electrode to the other; spacers between said layers, said spacers being in the form of membranes of an ion exchange material having a higher concentration than said first named layers with respect to ions of the same polarity, said membranes subdividing said housing into compartments through which compartments liquid may flow; means at one side of the housing for supplying liquid to be separated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

21. An apparatus for the separation of components of compounds in solution under the influence of an electric current and gravity, the apparatus comprising a housing having a top, bottom, ends and sides; a pair of horizontally spaced electrodes in said housing; a plurality of substantially parallel macroporous layers of particles of an ion exchange material of a certain polarity, said layers being disposed upright and transverse to the direction of an electric current flowing from one electrode to the other; spacers between said layers, said spacers being in the form of membranes of an ion exchange material of a polarity opposite to said certain polarity, said membranes subdividing said housing into compartments through which compartments liquid may flow; means at one side of the housing for supplying liquid to be separated into a plurality of adjacent compartments; and fluid withdrawal means near the opposite side of the housing, said fluid withdrawal means including at least two separate withdrawal ducts and fluid entry ports in said compartments from which ports said ducts extend, said ports being spaced from said supply means and from each other by being located on vertically fanned-out radii of different angular inclination extending from said supply means so as to receive liquid from separate strata disposed at different levels in said compartments between top and bottom of the housing, whereby fractions collecting in such strata under the influence of gravity may be separately withdrawn.

22. A process for separating non-conductive non-ionic components of a fluid, the process comprising confining the fluid between substantially parallel spaced barriers of ion exchange material, said barriers forming lateral boundaries of fluid compartments; maintaining an ionically conductive path between said barriers by an ion conductive porous filler in said chamber having a concentration of ions different from that of at least certain of the barriers for ions of the same polarity; passing an electric current through said barriers, filler, and the fluid between said barriers in said filler in a direction at an angle to said barriers; passing said fluid by flow in a general direction parallel to the plane of the barriers and at an angle to the direction of the electric current, from a point of inflow at one end of the compartments through the filler toward the opposite end of the compartments; subjecting said fluid, the filler and the barriers to a mechanical accelerating force acting in a general direction parallel to said barriers, as distinguished from action in a direction at right angles to the barriers; and withdrawing fluid fractions at spaced points of the same compartments, said points being located on vertically fanned-out radii extending from said inflow, each of said radii having a different angular inclination, whereby fluid volumes enriched in the relative content of lighter and heavier components are separately recoverable.

23. A process for separating non-conductive non-ionic components of a liquid, the process comprising, applying an electrical potential at spaced electrodes; confining the liquid between substantially parallel spaced barriers of ion exchange material between said electrodes, said barriers forming lateral boundaries of liquid compartments between said electrodes; maintaining an electrolyte in the spaces between the electrodes and the respective endmost barriers; driving ions of a surface active agent through said barriers and said compartments by said potential, thereby producing an electric current from electrode to electrode through the liquid in said chambers in a direction at an angle to the said bounding barriers; moving said liquid by flow in a general direction parallel to the plane of the barriers at an angle to the direction of the current from a point of inflow at one end of the compartments toward the opposite end of the compartments; subjecting the liquid between the barriers to a mechanical accelerating force acting in a general direction parallel to said barriers, as distinguished from action in a direction at right angles to said barriers; and withdrawing liquid at spaced points of the same compartments, said points being located on vertically fanned-out radii extending from said inflow, each of said radii having a different angular inclination, whereby liquid volumes enriched in the relative content of lighter and heavier components are separately recoverable.

24. The process of separating components of substances in the gaseous state, such as gas-vapor mixtures or vapor mixtures, the process comprising, introducing the gaseous mixture into the space between substantially parallel spaced barriers of ion exchange material, said barriers forming lateral boundaries of treatment compartments; passing the gaseous mixture through an ion conductive porous filler in said compartments, whereby vapor components are adsorbed by said filler, the filler having a concentration of ions different from that of at least certain of the barriers for ions of the same polarity; passing an electric current through said barriers and filler in a direction at an angle to said barriers; passing said mixture by flow in a general direction parallel to the plane of the barriers and at an angle to the direction of the electric current from a point of inflow at one end of the compartments through the filler toward the opposite end of the compartments; subjecting said filler and said barriers to a mechanical accelerating force acting in a general direction parallel to said barriers, as distinguished from action in a direction at right angles to said barriers; and withdrawing the fractions at spaced points of the same compartments, said points being located on vertically fanned-out radii having a different angular inclination, whereby fractions enriched in the relative vapor content are separately recoverable.

25. The method of separating components of an ionic liquid which comprises, confining the liquid between substantially parallel spaced barriers of ion exchange material, at least certain of said barriers being permeable to ions of one polarity and passage resistance to ions of the opposite polarity, said barriers forming lateral boundaries of liquid compartments; passing an electric current through said barriers and the liquid between said barriers in a direction at an angle to said barriers; passing the liquid by flow in a general direction parallel to the plane of the barriers and at an angle to the direction of the electric current from a point of inflow at one end of the compartments toward the opposite end of the compartments; subjecting the liquid and the barriers to a mechanical accelerating force, said force acting in a general direction parallel to said barriers, as distinguished from action in a direction at right angles to said barriers, and withdrawing liquid at spaced points of the same compartments, said points being located on vertically fanned-out radii extending from said inflow, each of said radii having a different angular inclination.

References Cited in the file of this patent

UNITED STATES PATENTS

| | | |
|---|---|---|
| 1,946,415 | Schmid | Feb. 6, 1934 |
| 2,354,553 | Sherk | July 25, 1944 |

FOREIGN PATENTS

| | | |
|---|---|---|
| 675,253 | Great Britain | July 9, 1952 |
| 666,674 | Great Britain | Feb. 13, 1952 |

OTHER REFERENCES

Fortune, July 1951, page 109.

Murphy et al.: "Journal of the Electrochemical Society," vol. 99, No. 12, December 1952, pages 520 to 526.